No. 625,155. Patented May 16, 1899.
S. R. DRESSER.
PIPE COUPLING.
(Application filed July 5, 1898.)
(No Model.) 2 Sheets—Sheet 1.
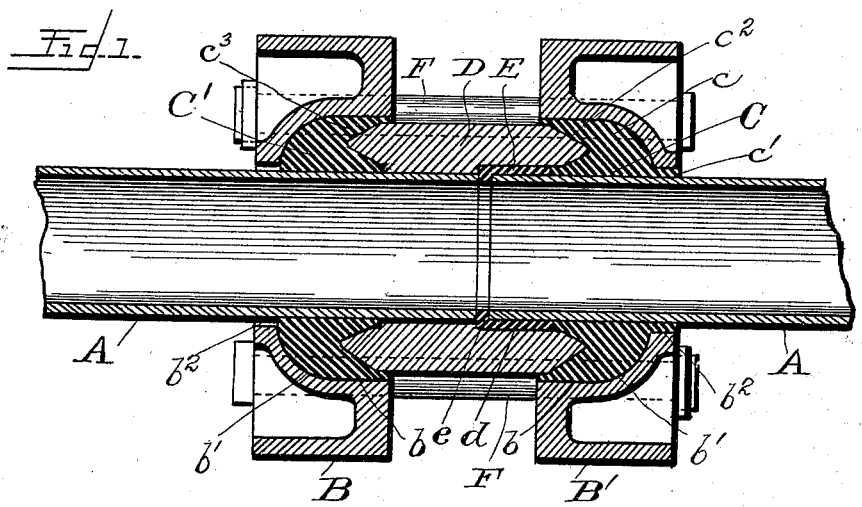
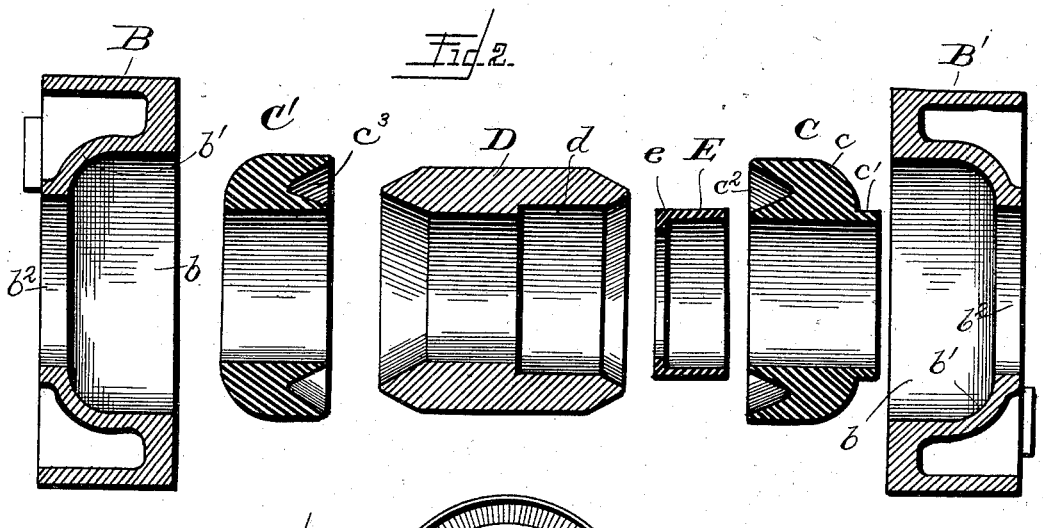
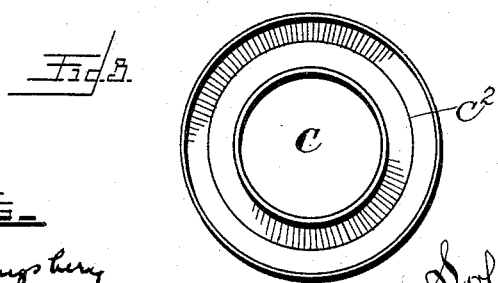
Witnesses
J. D. Kingsbury
B. W. Brockett
Inventor
Solomon R. Dresser
By Whitaker & Prevost
Attys.

No. 625,155. Patented May 16, 1899.
S. R. DRESSER.
PIPE COUPLING.
(Application filed July 5, 1898.)
(No Model.) 2 Sheets—Sheet 2.
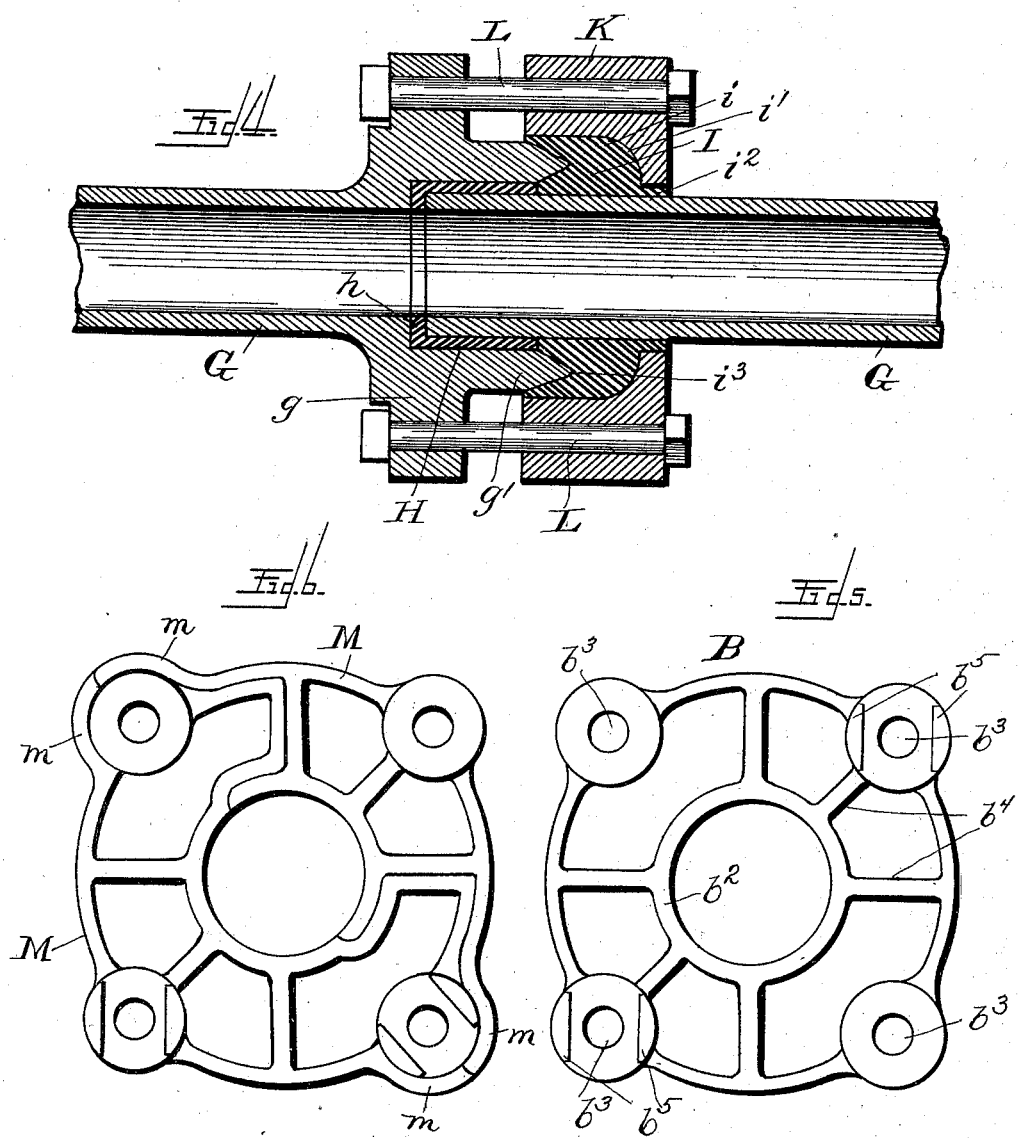

United States Patent Office.

SOLOMON R. DRESSER, OF BRADFORD, PENNSYLVANIA.

PIPE-COUPLING.

SPECIFICATION forming part of Letters Patent No. 625,155, dated May 16, 1899.

Application filed July 5, 1898. Serial No. 685,141. (No model.)

*To all whom it may concern:*

Be it known that I, SOLOMON R. DRESSER, a citizen of the United States, residing at Bradford, in the county of McKean and State of Pennsylvania, have invented certain new and useful Improvements in Pipe-Couplings; and I do hereby declare the following to be a full, clear, and exact description of the invention, such as will enable others skilled in the art to which it appertains to make and use the same.

My invention is an improvement in pipe-couplings; and it consists in the novel features hereinafter described, reference being had to the accompanying drawings, which illustrate one form in which I have contemplated embodying my invention, and said invention is fully disclosed in the following description and claims.

Referring to the drawings, Figure 1 represents a sectional view of the meeting ends of two sections of wrought-iron or other pipe connected by my improved coupling. Fig. 2 is a sectional view showing the parts of the coupling separated. Fig. 3 is an end view of one of the elastic packing and insulating rings. Fig. 4 is a view similar to Fig. 1, showing my invention applied to cast-metal pipes in which one end of each pipe is provided with an integral bell and clamping-plate. Fig. 5 is a plan view of a one-piece clamping-plate, and Fig. 6 is a similar view of a clamping-plate formed in two parts adapted to be united by the clamping-bolts of the coupling.

In cities where electric railways and underground electric conductors are employed much expense and annoyance are occasioned by the leakage of electricity being taken up by gas, water, and other pipes, producing, by electrolytic action a disintegration of the pipes affected, resulting in a partial destruction of the pipes and a leakage of the fluids conducted through the same. Owing to the fact that the sections of pipe are in electrical connection with each other through the thimbles or other couplings connecting them this electrolytic action may take place at a considerable distance from the point at which the current enters the pipe and may extend throughout a long section of piping. In order to prevent as far as possible this electrolytic action from being set up and to limit its action as much as possible in case such action takes place, it is the object of my invention to provide a coupling for such pipes which in addition to uniting the adjacent ends of the pipe-sections will insulate each section from its adjacent sections. By this means the electrolytic action will be in a large measure prevented altogether, and if the conditions are favorable to such action it will only take place within a single section of the pipe.

In Figs. 1, 2, and 3 I have shown my invention embodied in a coupling for the meeting ends of two sections of ordinary wrought-iron or other pipe having plain ends. A A represent the pipe-sections, the meeting ends of which are not threaded. B B' represent clamping-plates, which in this instance are formed in one piece, as shown in Fig. 5. Each of these plates is provided on its in face with a circular recess $b$ of greater diameter than the pipe $a$, the walls of said recess being curved or tapered inwardly toward the outer face of the plate, as at $b'$, where a concentric circular aperture $b^2$ is formed of a diameter only slightly greater than the pipe A. The portions of the plates B B' between the walls of the recess $b$ and the outer edges of the plate are cored or recessed to make them lighter, and each plate is provided with bolt-holes $b^3$ and strengthening ribs or webs $b^4$, extending radially and connecting the inner portions and the outer portions, as shown in Fig. 5. C represents a packing and insulating ring, which is preferably formed of rubber molded in the desired shape, although it may be formed of any other suitable material which will answer the same purposes. This ring C has a central aperture of substantially the size of the pipes A and is provided with an enlarged portion $c$, adapted to fit within the recess $b$ of one of the clamping-plates B B' and having a curved outer face to conform to the shape of said recess. Said ring is also provided with an elongated sleeve portion $c'$, which is adapted to extend through the central aperture $b^2$ of the clamping-plate. If the ring C is inserted within one of the clamping-plates and then slipped over one end of a pipe, as in Fig. 1, the pipe will be entirely insulated from the clamping-plate. The ring C at the end opposite the sleeve portion $c'$ is provided with an annular recess $c^2$, preferably V-shaped in cross-section, to receive one end of a coupling-sleeve D, formed of metal, having a central aperture and having its edges at each end formed in a V shape in cross-section. The central bore of the sleeve D is preferably increased at one end of the same, as shown at $d\ d$, to receive an insulating-sleeve E, having an internal diameter sufficient to enable it to be slipped over the end of one of the pipe-sections and provided at one end with an inwardly-extending annular flange $e$, which engages the end of the pipe-section, as shown in Fig. 1, and thus prevents the adjacent ends of the pipe-sections A A from touching each other. It is obvious that I may provide each of the meeting ends of the pipe-sections with one of these insulating-sleeves E, if desired; but I have found that it is sufficient to provide one of said sleeves adjacent to the insulating and packing ring C. C' represents a packing-ring in all respects similar to the ring C, except that it is not provided with the sleeve portion, said ring C' being formed to fit the recess $b$ in one of the clamping-plates and having the annular groove $c^3$ V-shaped in cross-section. It is obvious, however, that instead of employing the rings C and C', I might employ two of the rings C. In uniting the ends of two pipe-sections with this form of device the clamping-plates are slipped over the ends of the pipes and moved in opposite directions from the ends to enable the other parts to be placed in position. One of said pipe ends is then provided with the insulating and packing ring C and the insulating-sleeve E, and the other pipe end is provided with the ring C', (or another ring C,) and the metal coupling-sleeve D is then slipped over the insulating-sleeve E, as before described. The rings C C' are then moved toward the coupling-sleeve D until the ends of said sleeve are seated in the annular grooves $c^2\ c^3$ of the said rings. The coupling-plates are then placed in position upon the rings C C', as shown in Fig. 1, and clamping-bolts F F are passed through the bolt-holes $b^3$ of said plates and provided with nuts $f$, by means of which the plates B B' are drawn toward each other, thus clamping the parts together and forming a tight joint. The plates B B' are each provided adjacent to two or more of the bolt-holes (preferably two, as shown in Fig. 5) with parallel projections or webs $b^5\ b^5$ to engage the heads of the bolts and prevent them from turning. This construction enables two of the bolts to be inserted from each end of the coupling, and the clamping-plates can thus be cast exactly alike. It will be observed that the pipe-section A, which engages the ring C, is entirely insulated from the adjacent pipe-section and from the clamping-plate through which it passes, so that the electric current cannot pass through the coupling from one pipe-section to the other.

In Fig. 4 I have shown my invention applied to a bell-and-spigot coupling for cast-metal pipe, in which each section of pipe has a bell and clamping-plate cast integrally with it. In this figure, G represents one of the pipes, one end of which is plain and the other is provided with the integral clamping plate or flange, having bolt-holes extending therethrough and having the annular bell $g'$, the outer edges of which are V-shaped in cross-section. The bell $g'$ is of sufficient size to receive an insulating-sleeve H, (similar to the sleeve E, previously described,) adapted to fit over the plain end of the next adjacent pipe-section and having at one end an inwardly-extending flange $h$ to prevent the end of the pipe from engaging the bottom of the bell. I represents a packing and insulating ring, (similar to the ring C, previously described,) having the enlarged portion $i$, provided with a curved outer surface $i'$ to fit within the clamping-plate recess, the sleeve portion $i^2$, and the annular recess $i^3$, V-shaped in cross-section to receive the end of the bell. K represents the clamping-plate, similar to the ring B, heretofore described, and connected by bolts L L to the clamping-flange $g$. In this construction it will be seen that the end of the pipe which enters the bell $g'$ is entirely insulated from the bell and from the clamping-plate K, through which the pipe passes. It is obvious that instead of using the insulating-sleeves E H, hereinbefore described, I may simply wrap the portion of the pipe adjacent to the end with insulating material; but I prefer to use said sleeves. In this form of my invention the retaining webs or projections on the clamping-plate may be omitted and the clamping-flange provided with shoulders $g^2$ to engage the heads of the bolts and prevent them from turning, as shown in Fig. 4.

In some cases I may prefer to form the clamping-plates in two parts, as indicated in Fig. 6, for the purpose of enabling them to be more readily placed upon the pipes and removed therefrom and for the purpose of making quick repairs without disturbing the adjacent ends of the pipes unnecessarily. In such case the two parts M M of the plate will be provided with overlapping portions $m\ m$, through which the two of the bolt-holes pass, so that the clamping-bolts will also serve to hold the parts of the plates together.

What I claim, and desire to secure by Letters Patent, is—

1. The herein-described combination of a clamping-ring provided with an aperture therethrough, a pipe-section having a uniform diameter throughout its length less than the diameter of the aperture in said ring and passing through said aperture, a second pipe-section, means for insulating the pipe-sections from each other, means for insulating said first-mentioned pipe-section from the ring through which it passes and means for compressing the insulating material by a movement of the clamping-ring longitudinally of the pipe-sections, whereby said pipe-sections are insulated from each other, said ring is insulated from the pipe-section passing therethrough and provision is made for the movement of the said pipe-section through said ring to allow for expansion and contraction, substantially as described.

2. The herein-described combination with two pipe-sections, of a clamping-ring for each pipe-section, provided with an aperture through the same for the passage of its pipe-section therethrough, means for insulating the adjacent ends of said sections from each other, means for insulating each of said rings from the pipe-section passing therethrough, clamping means for drawing said rings toward each other to compress the insulating material, whereby said pipe-sections are insulated from each other, each pipe-section is insulated from the ring through which it passes and provision is made for the free movement of each of said pipe-sections through their respective rings and through the insulating material to allow for longitudinal expansion and contraction, substantially as described.

3. A pipe-coupling for uniting the adjacent ends of pipe-sections and insulating them from each other, including among its members, a cylindrical portion, a clamping-plate adapted to surround one of said pipe-sections and provided with clamping-bolts, and an insulating and packing ring having a portion interposed between said cylindrical portion and said plate and an insulating sleeve portion surrounding said pipe-section between it and said plate, substantially as described.

4. A pipe-coupling for uniting the adjacent ends of pipe-sections and insulating them from each other including among its members a cylindrical portion adapted to extend over the end of one of said pipe-sections, a clamping-plate adapted to surround said pipe-section and provided with a packing-recess on one side, and a packing and insulating ring having a portion adapted to be interposed between the said cylindrical portion and said plate and to occupy said packing-recess and an insulating-sleeve adapted to extend between said plate and said pipe-section, substantially as described.

5. A pipe-coupling for uniting the adjacent ends of pipe-sections and insulating them from each other including among its members, a cylindrical portion to receive one end of a pipe-section, provided with an annular edge V-shaped in cross-section, a clamping-ring adapted to surround the pipe-section the end of which is inserted in said cylindrical portion, provided with a packing-recess, and clamping-bolts, and a packing and insulating ring adapted to fit said packing-recess, provided on one end with an annular groove V-shaped in cross-section to receive the end of said cylindrical portion and at the other end with an insulating sleeve portion interposed between the said plate and said pipe-section, substantially as described.

6. A pipe-coupling for uniting the adjacent ends of pipe-sections and insulating them from each other including among its members a cylindrical portion to receive one end of a pipe-section provided with an annular edge V-shaped in cross-section, a clamping-ring adapted to surround the pipe-section the end of which is inserted in said cylindrical portion, provided with a packing-recess, and clamping-bolts, and a packing and insulating ring adapted to fit said packing-recess, provided on one end with an annular groove V-shaped in cross-section to receive the end of said cylindrical portion and at the other end with an insulating-sleeve portion interposed between the said plate and said pipe-section, and insulating material engaging the end of said pipe-section, substantially as described.

7. A pipe-coupling for uniting the ends of two pipe-sections and insulating them from each other comprising among its members, two clamping-plates adapted to surround said pipe-sections, each provided with a packing-recess and apertures for clamping-bolts, a coupling-sleeve adapted to extend over the adjacent end portions of the said pipe-sections, packing-rings adapted to engage said packing-recesses and to engage the ends of said sleeve, one of said rings being provided with an insulating-sleeve adapted to be interposed between one of said pipe-sections and the clamping-ring through which it passes and the clamping-bolts, substantially as described.

8. A coupling for uniting the adjacent ends of pipe-sections and insulating them from each other, comprising among its members, two clamping-plates each provided with an aperture for the passage of the pipe therethrough and a packing-recess, a coupling-sleeve adapted to cover the adjacent portions of the pipe-sections between said plates, the packing-rings engaging said packing-recesses, and adapted to engage the ends of said sleeve, one of said rings being provided with an insulating-sleeve adapted to lie between one of said plates and the pipe passing therethrough, insulating material interposed between the ends of said pipe-sections and the clamping-bolts for uniting said clamping-plates, substantially as described.

9. A coupling for uniting the adjacent ends of pipe-sections and insulating them from each other, comprising among its members, two clamping-plates each provided with an aperture for the passage of the pipe therethrough and a packing-recess, a coupling-sleeve adapted to cover the adjacent portions of the pipe-sections, between said plates, the packing-rings engaging said packing-recesses, and adapted to engage the ends of said sleeve, one of said rings being provided with an insulating-sleeve adapted to lie between one of said plates and the pipe passing therethrough, an insulating-sleeve engaging said pipe within the coupling-sleeve, and having a flange engaging the end of the pipe, and the clamping-bolts for uniting said clamping-plates, substantially as described.

In testimony whereof I affix my signature in the presence of two witnesses.

SOLOMON R. DRESSER.

Witnesses:
JOHN LEY,
M. H. BYLES.